United States Patent [19]
Aho

[11] Patent Number: 5,593,012
[45] Date of Patent: * Jan. 14, 1997

[54] LIMITED FIXED TORQUE SLIP COUPLING

[75] Inventor: Richard E. Aho, Fort Lauderdale, Fla.

[73] Assignee: MileMarker, Inc., Pompano Beach, Fla.

[ * ] Notice: The term of this patent shall not extend beyond the expiration date of Pat. No. 5,431,603.

[21] Appl. No.: 285,023

[22] Filed: Aug. 2, 1994

Related U.S. Application Data

[63] Continuation-in-part of Ser. No. 5,562, Jan. 19, 1993, Pat. No. 5,363,948.

[51] Int. Cl.$^6$ ............................ F16D 35/00; F16D 43/20
[52] U.S. Cl. .................... 192/56.1; 192/58.41; 192/58.4; 192/30 W; 464/30
[58] Field of Search .................... 192/58 B, 58 C, 192/56 F, 103 F, 103 R, 56.1, 58.1, 58.2, 58.4, 58.41, 30 W; 477/177, 178; 464/30

[56] References Cited

U.S. PATENT DOCUMENTS

| | | |
|---|---|---|
| 1,238,447 | 8/1917 | Severy . |
| 2,708,018 | 5/1955 | Dudley . |
| 2,863,542 | 12/1955 | Kelsey . |
| 3,852,977 | 12/1974 | Chaput . |
| 4,031,780 | 6/1977 | Dolan . |
| 4,037,429 | 7/1977 | Britzius . |
| 4,083,419 | 4/1978 | Fogelberg . |
| 4,132,297 | 1/1979 | Brown . |
| 4,332,304 | 6/1982 | Barnow . |
| 4,462,491 | 7/1984 | Kono et al. ................... 192/150 X |
| 4,557,359 | 12/1985 | Woodbridge . |
| 4,650,028 | 3/1987 | Eastman . |
| 4,677,875 | 7/1987 | Batchelor . |
| 4,714,129 | 12/1987 | Mueller . |
| 4,782,930 | 11/1988 | Kuroiwa et al. . |
| 4,884,670 | 12/1989 | McCormick et al. ................. 192/56 F |
| 4,928,803 | 5/1990 | Ishikawa . |
| 4,949,594 | 8/1990 | Galhotra . |
| 4,962,837 | 10/1990 | Teraoka . |
| 5,006,098 | 4/1991 | Yoshinaka . |
| 5,117,937 | 6/1992 | Namioka . |
| 5,178,251 | 1/1993 | Losi ................... 192/58 A X |
| 5,201,391 | 4/1993 | Arai et al. .............. 192/58 B |
| 5,355,983 | 10/1994 | Radomski et al. ............... 192/56 F |
| 5,363,948 | 11/1994 | Aho et al. ............... 192/58 R |
| 5,415,260 | 5/1995 | Aho et al. ............... 192/58 R |
| 5,419,745 | 5/1995 | Moolenaar et al. ............... 477/178 X |
| 5,431,603 | 7/1995 | Aho ................... 192/58 B X |

FOREIGN PATENT DOCUMENTS

| | | |
|---|---|---|
| 2-57729 | 2/1990 | Japan . |
| 3-103624 | 4/1991 | Japan . |
| 624334 | 12/1988 | U.S.S.R. . |
| 1333878 | 3/1971 | United Kingdom . |

*Primary Examiner*—Rodney H. Bonck
*Attorney, Agent, or Firm*—Luedeka, Neely & Graham, P.C.

[57] ABSTRACT

A limited fixed torque slip coupling for connecting rotatable shafts. In one embodiment, a first rotatable member is coupled to a second rotatable member to enable rotation of the first and second rotatable members without substantial relative movement of the members during normal operation when the torque experienced does not exceed a predetermined break-away torque. The coupling of the present invention also enables detection and comparison of the rotational rates of the rotatable members to permit a user to avoid damage to equipment in the event torque greater than that experienced under normal operating conditions is encountered.

7 Claims, 7 Drawing Sheets

LIMITED FIXED TORQUE SLIP COUPLING

This is a continuation-in-part of application Ser. No. 08/005,562, filed Jan. 19, 1993, and issued as U.S. Pat. No. 5,363,948, on Nov. 15, 1994.

TECHNICAL FIELD

The present invention relates generally to coupling systems for connecting rotating shafts. More particularly the present invention relates to a slip coupling which enables direct drive between connected shafts under normal operating conditions while enabling relative rotation between connected shafts above a predetermined break away torque to avoid damage to equipment.

BACKGROUND

Typical slip couplings include springs, brake shoes or other mechanical limiting devices to limit torque transfer from a drive shaft to a driven shaft to avoid damage to equipment. For example, equipment such as a saw may include a slip coupling for limiting torque transfer of under high load conditions, e.g., such as when the saw blade hits a nail and is stopped. However, such couplings need improvement, as they are subject to frequent breakage or maintenance, are difficult to adjust, and are of limited flexibility.

Accordingly it is an object of the present invention to provide an improved slip coupling;

It is yet another object of the present invention to provide a slip coupling for connecting rotating shafts which enables relative rotation between the connected shafts above a predetermined break away torque;

Yet another object of the present invention is to provide a slip coupling that limits torque transfer to the driven shaft;

Another object of the present invention is to provide a slip coupling of the character described which enables detection of relative rotation of the connected shafts;

A still further object of the present invention is to provide a slip coupling of the character described which transfers torque to the driven shaft at substantially the same rotational speed as the driving shaft under torque conditions below a predetermined break away torque;

Still another object of the present invention is to provide a slip coupling of the character described that is inexpensive and uncomplicated in configuration as compared to conventional slip couplings.

SUMMARY OF THE INVENTION

Having regard to the foregoing objects, the present invention is directed generally to a limited fixed torque slip coupling for use in a device in which a motive force is applied to a first rotatable member coupled to a second rotatable member to provide rotation of the first and second rotatable members without substantial relative movement of the members during normal operation when the torque in the device does not exceed a predetermined break-away torque.

The slip coupling comprises a first rotatable body rotatable in response to rotation of said first rotatable member, a second rotatable body, a chamber defined between said first and second rotatable bodies, and a viscous medium disposed within the chamber. The medium has a sufficient viscosity to transfer rotation from the first body to the second body substantially without relative rotation between the first and second rotatable bodies during normal operation for torques below the break away torque and for allowing relative rotation between the first and second bodies when the torque in the device exceeds the predetermined break away torque.

Sensors are provided for sensing the rotational rates of the first and second rotatable bodies and the rotational rates are compared by a comparator. An indicator is provided to indicate any difference between the sensed rotational rate of the first rotatable body as compared to the sensed rotational rate of the second rotatable body.

The present invention is particularly well-suited for use with fixed base machines, such as electric saws and the like. To this end, the invention is described below in connection with a slip coupling.

BRIEF DESCRIPTION OF THE DRAWINGS

These and other objects, features and advantages of the present invention will become apparent from the following detailed description and when considered in accordance with the appended claims and accompanying drawings, in which:

FIG. 11 is a cross-sectional view of the disk of FIG. 9 taken along line 10—10;

DETAILED DESCRIPTION OF PREFERRED EMBODIMENTS

Figures 1, 4:
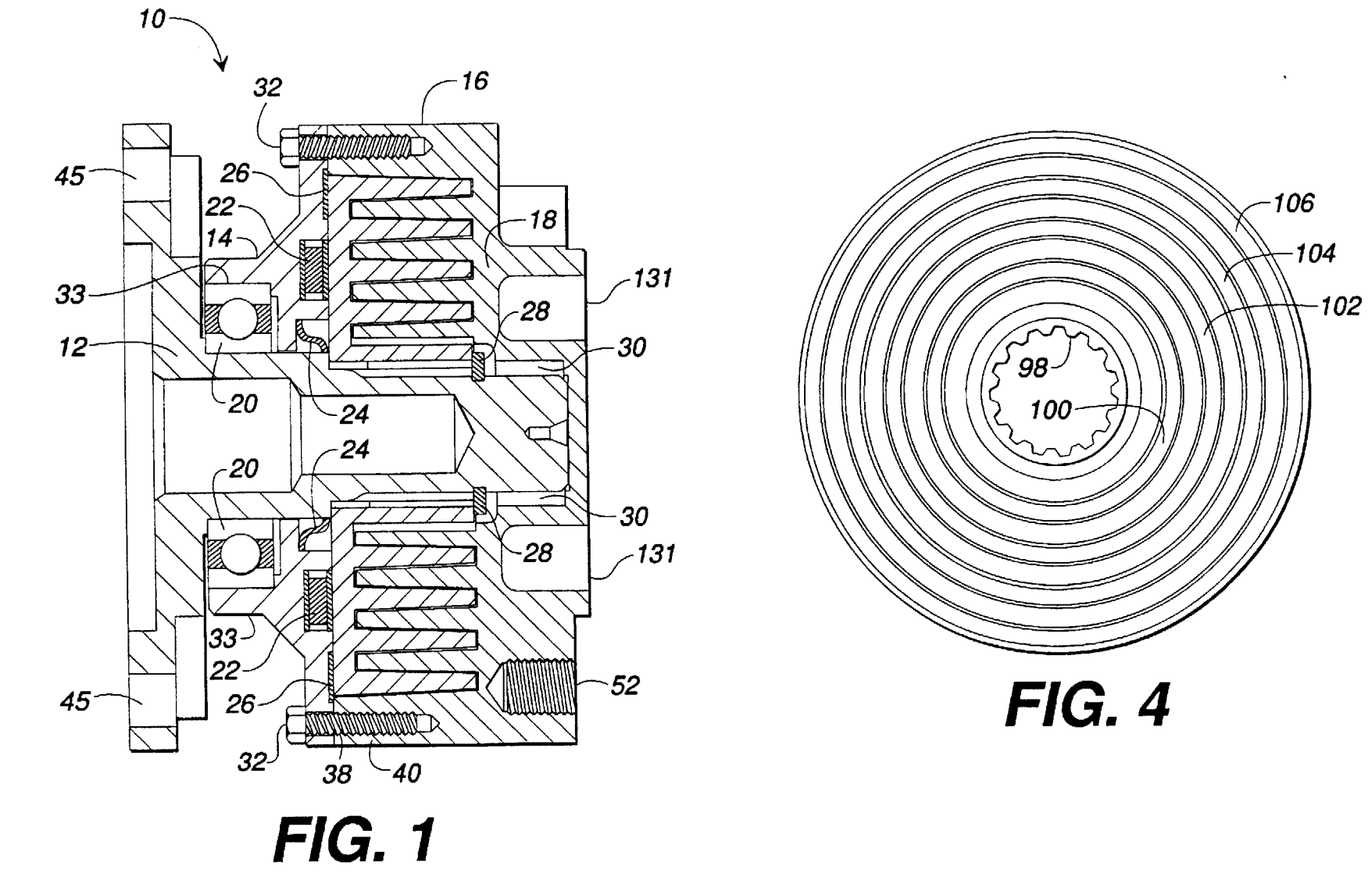
FIG. 1 is a cross-sectional view of a preferred embodiment showing a slip coupling in accordance with the present invention.
FIG. 4 is a front view of a center ring having circular fins taken along line 4—4 of FIG. 3.

Referring now to the drawings, in which like characters refer to like parts throughout the several views. FIG. 1 shows a slip coupling 10 embodying one embodiment of the present invention. The coupling 10 includes a rotatable splined shaft 12, a rotatable body 14, a rotatable center ring 16, and a rotatable cap ring 18. In addition, the coupling 10 preferably includes a roller bearing 20, a thrust bearing 22, a seal 24, a nylon gasket 26, a retaining ring 28, a needle bearing 30, and a plurality of fasteners, such as bolts 32.

As will be explained more fully below, the coupling of the present invention also preferably includes structure which enables the detection and comparison of the rotational rates of the center ring 16 and the cap ring 18. This feature of the invention enables a user to detect overload conditions so that appropriate action may be taken to avoid damage of equipment and/or unsafe operating conditions in the event torque greater than that experienced under normal operating conditions is encountered.

Figure 3:
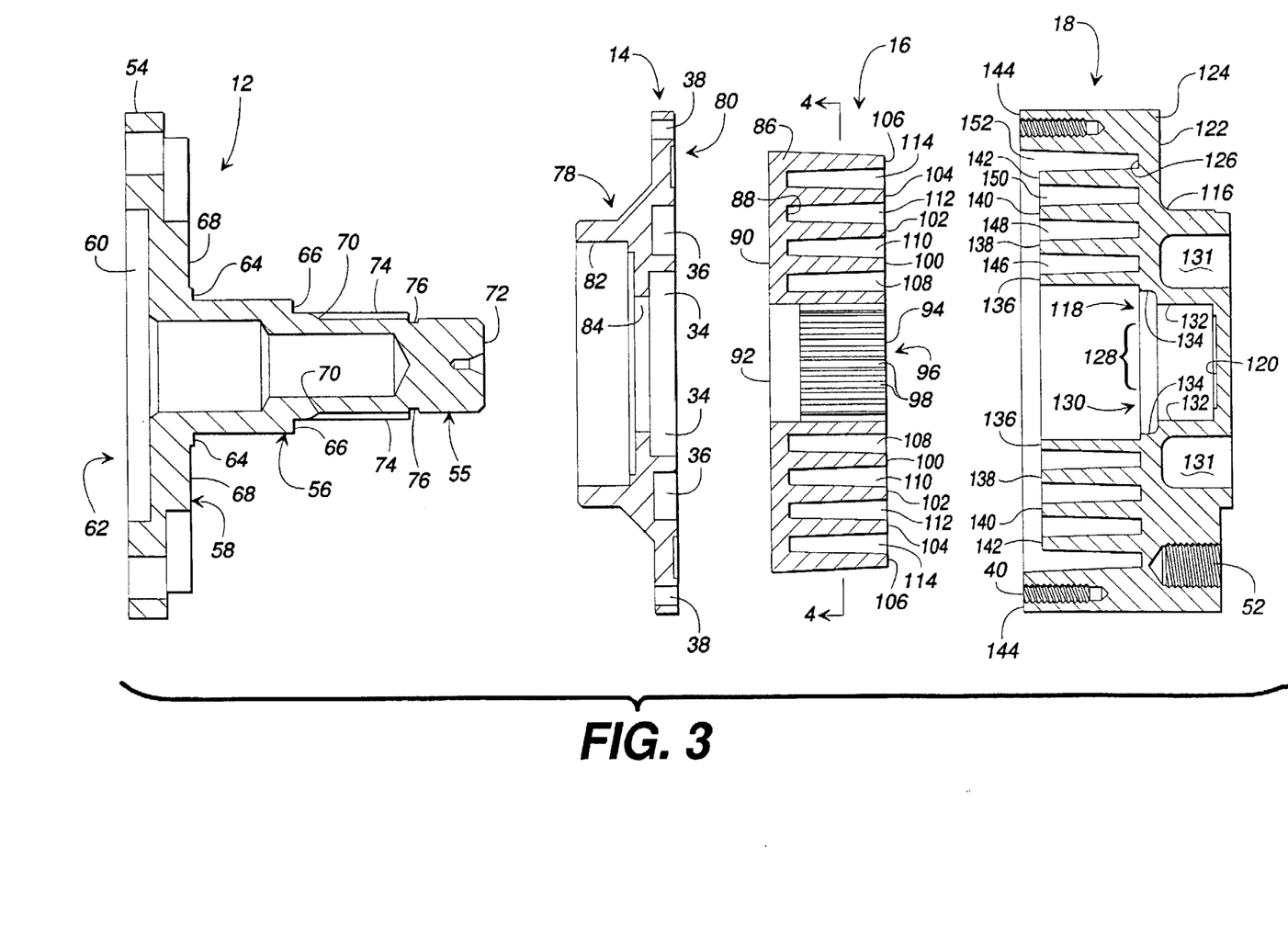
FIG. 3 an exploded view of FIG. 1.

Briefly described, the preferred embodiment of the coupling 10 may be assembled as follows. The roller bearing 20 and body 14 are press-fit onto the shaft 12 with a throat 33 of the body 14 surrounding the bearing 20. The seal 24 and the thrust bearing 22 are then press-fit into a pair of annular surfaces 34 and 36, respectively, provided on the body 14 (FIG. 3). The center ring 16 is preferably substantially filled with a yieldable, viscous medium, preferably a silicone rubber compound having a rating of about 30,000,000 centipoise, and press-fit onto the shaft 12 and held in place adjacent the body 14 by the retaining ring 28. The cap ring 18 is thereafter press-fit into the center ring 16, as will be explained more fully below, and secured to the body 14 as by bolts 32 inserted through openings 38 of the Body 14 and threadably received within threaded openings 407 of the cap ring 18.

An example of a preferred 30 million viscosity medium is a low content vinyl polymer silicone rubber available under the name Compound C-162 from Wacker Silicones Corporation of Adrian, Mich. Compound C-162 has a specific gravity of 0.98 at 25° C. (ASTM-D792), a Williams plasticity of from about 85 to about 120 (1 hr., 1/100 min. WSTM-1262) and a brittle point of 0.73° C. (ASTM-D746). The material safety data sheet for this product, the disclosure of which is incorporated herein by reference, is available from Wacker Silicones Corporation, 3301 Sutton Road, Adrian, Mich. 49221, (517) 264-8500.

Figure 2:
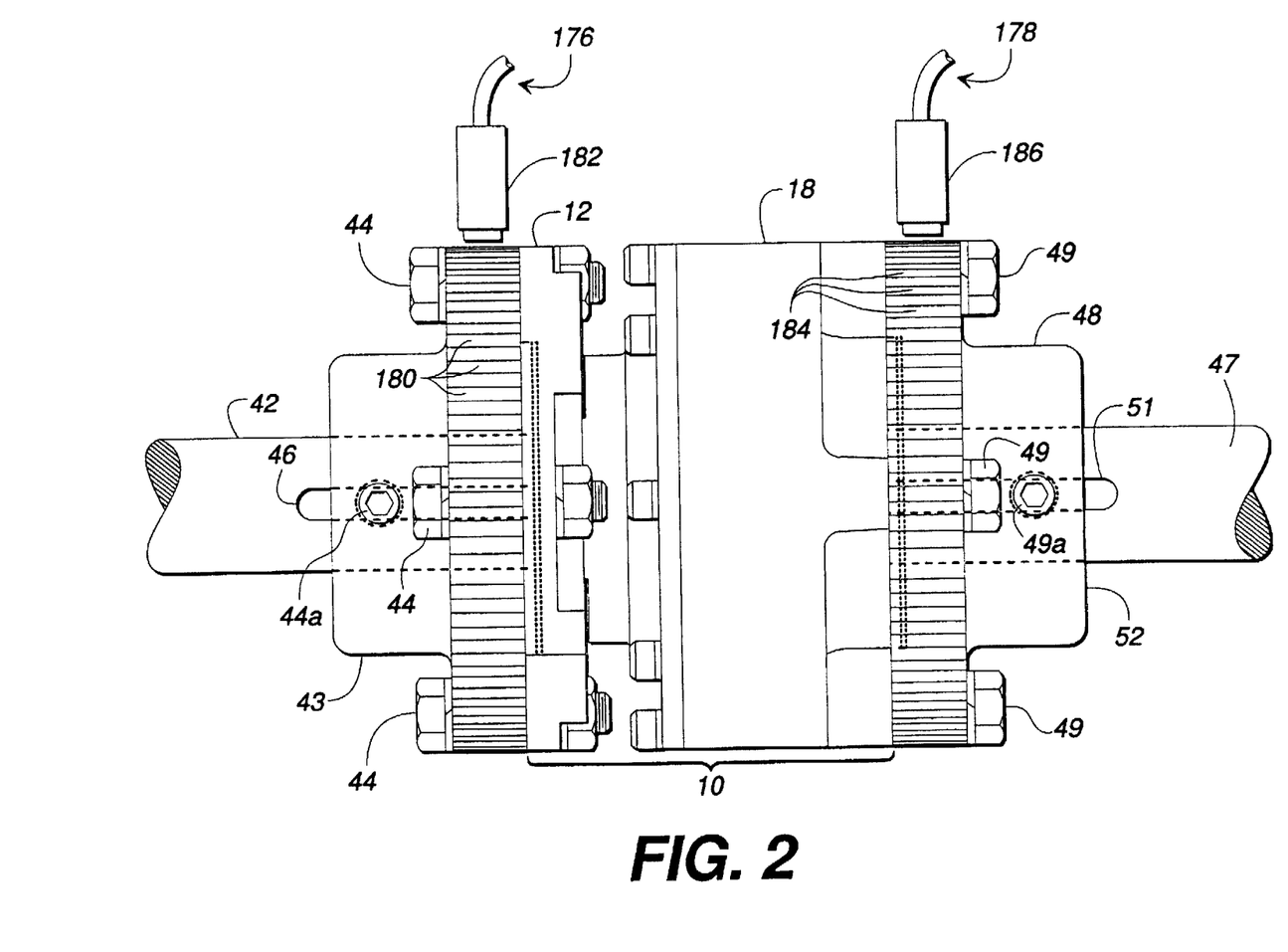
FIG. 2 is a front elevational view showing the coupling of FIG. 1 positioned to couple a driven shaft to a driving shaft.

With reference to FIG. 2, the shaft 12 may be connected to a powered rotating member, such as a drive shaft 42 having an adjustable mounting bracket 43 mechanically secured to the shaft 12 as by mounting bolts 44 extending through openings 45 provided on the base of the shaft 12. The bracket 43 may be secured to the drive shaft 42 as by a mounting bolt 44a extending through mounting groove 46 defined through the shaft 42. Likewise, the cap ring 18 may be connected to a driven shaft 47 with adjustable mounting bracket 48 secured to the cap ring 18 as by mounting bolts 49 threadably received into threaded openings 50 located on the cap ring 18. The bracket 48 may be secured to the driven shaft 47 as by mounting bolt 49a extending through mounting groove 51 defined through the shaft 47.

With further reference to FIG. 3, the shaft 12 also preferably includes a base section 54, an intermediate section 56, and a cylindrical splined section 58. A circular recess in the form of a blind bore 60 is preferably defined on side 62 of the base section 54 at a location on the side 62 opposite the intermediate section 56 for fittingly receiving the drive shaft 42.

The intermediate section 56 preferably defines spaced apart annular shoulders 64 and 66 configured to engage the roller bearing 20 and the center ring 16, respectively. A shoulder 68 may be located adjacent to the shoulder 64 between the base section 54 and the intermediate section 56 to provide clearance between the shaft 14 and the body 14 to facilitate smooth rotation.

The splined section 58 may include a curved base 70 adjacent the intermediate section 56 and preferably terminates at a flat tip end 72 which is spaced apart from the base section 54. A plurality of elongate splines 74 are defined on the periphery of the splined section 58 between the base section 54 and the tip end 72 to enable direct drive between the shaft 12 and the center ring 16, as explained below. An annular groove 76 is preferably provided on the splined section 58 at a location thereon which is spaced from the tip end 72 so that groove 76 substantially bisects the splines 76 at this point. The groove 78 is preferably sized to receive the retaining ring 28 to hold center ring 16 on shaft 12.

As may be seen in FIG. 3, the body 14 may further include a cylindrical section 78 which extends substantially perpendicular from a disk-shaped section 80 and includes a pair of annular surfaces 82 and 84. The annular surface 82 preferably has a diameter sized to fittingly engage the roller bearing 20 when the body is positioned on the shaft 12. The annular surface 84 preferably has a diameter slightly greater than the diameter of the intermediate section 56 of the shaft 12 so that the body does not engage the shaft when positioned thereon. The section 80 of the body 14 includes the annular surface 34 which is sized to receive the seal 24, as mentioned previously.

With additional reference to FIG. 3, the center ring 16 may be provided by a flat disk 86 having a front surface 88 spaced apart from a rear surface 90. An annular opening 92 is defined across the central thickness of the disk 86 and sized to receive the splined section 74 of the shaft 12 therethrough.

A cylindrical extension 94 having an inner diameter sized to slip over the intermediate section 56 of the shaft 12 preferably extends outwardly from the front surface 88 of the disk 86. The extension 94 is integral with the front surface 88 adjacent the opening 92 so that the extension 94 and the opening 92 cooperate to provide an elongate tunnel 96 for receiving the splined section 74 of the shaft 12. A plurality of teeth 98 are provided on the inner periphery of the extension 94 and positioned to engage the splines 118 of the shaft 12 so that rotation of the shaft 12 will directly drive the center ring 16.

Annular fins 100, 102, 104 and 106 extend outwardly from the front surface 88 in a direction such that the major surfaces of the fins 100–106 are generally perpendicular to the front surface 88. The fins 100–106 are preferably substantially concentric and are preferably substantially circular in cross-section and tapered such that each fin decreases in thickness in a direction away from the front surface 88, as will be explained more fully below.

Corresponding and substantially concentric annular cavities 108, 110, 112 and 114 are defined between adjacent annular surfaces of the fins 100, 102, 104, 106, and the extension 94, to wit: annular cavity 106 is formed by the outer periphery of the extension 94 and the inner diameter of fin 100, annular cavity 110 is formed by the outer periphery of fin 100 and the inner periphery of the fin 102, annular cavity 112 is formed by the outer periphery of fin 102 and the inner periphery of fin 104, and annular cavity 114 is formed by the outer periphery of fin 104 and the inner periphery of fin 106. This may be seen in FIG. 4, which is a cross-sectional view of the center ring 16 taken along line 4—4 of FIG. 3.

In a preferred embodiment, the fins 100–106 are preferably substantially circular in shape, equally spaced apart, and substantially concentric. Also, the fins 100–106 are preferably of a smooth finish to avoid a substantial shearing of the fluid and subsequent torque increase. In addition, it will be understood that virtually any number of fins may be provided, depending on the desired torque characteristics.

With reference to FIGS. 3 and 4, the cap ring 18 preferably has a generally cylindrical section 116 having an open end 118 spaced apart from a closed end 120. The open end 118 may be connected, as by welding, to a rear surface 122 of a flat disk 124. The rear surface 122 is preferably spaced apart from a front surface 126 of the disk and includes an opening 128 defined across the central thickness of the disk 124 which is concentrically and abuttingly aligned with the open end 118 of the section 116 as shown to define a blind bore 130. In a preferred embodiment, an annular groove 131 may be cut or otherwise provided on the exterior of the section 116 to reduce the weight of the cap ring 18.

The blind bore 130 is preferably sized to rotatably receive the end 58 of the shaft 12, as best seen in FIG. 1. To this end, the cylindrical section 160 provides annular shoulder 132 and 134 The shoulder 132 is sized to receive needle bearing 30 and the shoulder 134 is sized to provide clearance for the retaining ring 28.

Annular fins 136, 138, 140, 142 and 144 preferably extend outwardly from the front surface 126 in a direction such that the major surfaces of the fins 136–144 are generally perpendicular to the front surface 126. The fins 136–144 are preferably substantially concentric and circular, but could be of other configuration. For example, the fins may be substantially non-circular, preferably oval, in cross-section and tapered such that they decrease in thickness in a direction away from the front surface 126. Annular fin 144 preferably has a thickness which is substantially greater than the thickness of the fins 136–142 to enable threaded openings 40 to be bored therein.

Corresponding and substantially concentric annular cavities 146, 148, 150 and 152 are preferably defined between adjacent annular surfaces of the fins 136–144, to wit: annular cavity 146 is formed by the outer periphery of fin 136 and the inner periphery of fin 138, annular cavity 148 is formed by the outer periphery of fin 138 and the inner periphery of the fin 140, annular cavity 150 is formed by the outer periphery of fin 140 and the inner periphery of fin 142, and annular cavity 152 is formed by the outer periphery of fin 142 and the inner periphery of fin 144.

The cavities 146–152 are preferably filled with the viscous medium prior to assembly of the coupling 10, as will be explained more fully below. In this regard, it is noted that the preferred viscous medium has a consistency similar to that of modeling clay. Accordingly, it may be necessary to force the medium into the cavities with a suitable tool, such as an elongate rod or the like.

Figure 5:
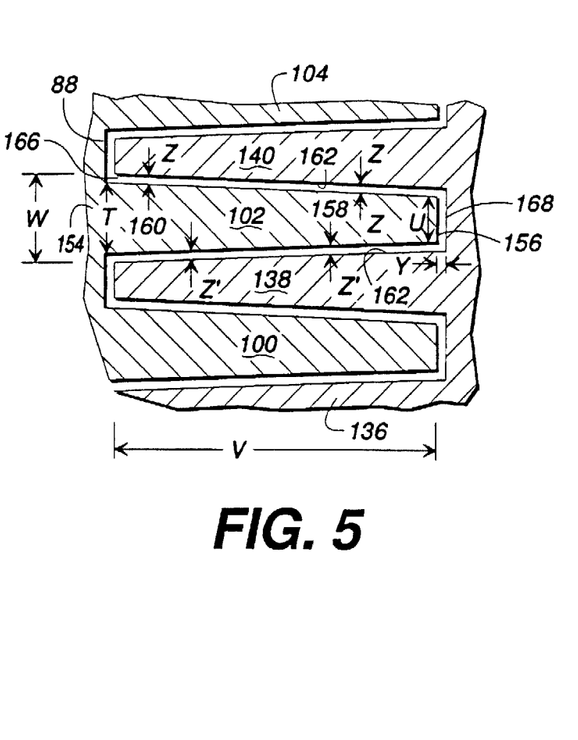
FIG. 5 is a close-up view of a portion of FIG. 1 showing the relationship between the annular fins of the center ring and the body ring in greater detail.

As mentioned previously, the center ring 16 and cap ring 18 may be press-fit together in an interleaved configuration during assembly of the coupling 10. To this end, as best seen in FIG. 5, the fins 100–106 of the center ring 16 are shown received within the cavities 146–152, respectively, of the cap ring 18, and the fins 136–144 are shown received within the cavities 108–114, respectively, so that the fins are positioned in a compact interleaved relationship.

The depicted fins 100–106 and fins 136–144 (and hence the corresponding cavities) are preferably uniform in size and taper, however, it will be understood that the fins may be nonuniform in size and taper. The fins may be integrally formed with the rings 16 and 18, respectively or may be attached, as by welding, to the front surfaces of the rings.

For sake of brevity, the relationship between the fins 100–106 and fins 136–144 will be described only with respect to cavity 148 formed by fins 140, 138 of the cap ring 18 and of the fin 102 of the center ring 16, it being understood that the remaining fins are similarly disposed.

The fin 102 has a base 154 adjacent the front surface 88 of the center ring 18 and terminates in a tip 156 opposite the base 154. The base 154 has a thickness T and the tip 156 has a thickness U so that the fin 102 has a bottom annular surface 158 spaced apart from a top annular surface 160 in accordance with the taper of the fin 142. The fin 102 is preferably of substantially uniform taper from the base 154 to the tip 156, however, it will be understood that the thickness of the fin may be varied and that areas of nonuniform taper may be provided if desired.

The cavity 148 has annular spaced apart sidewalls 162 and 164 formed by the inner periphery of the fin 140 and the outer periphery of the fin 138, respectively. The cavity 148 therefore provides an annular, tapered blind bore having a depth V. Open end 166 of the cavity 148 has a width W and blind or closed end 168 of the cavity is provided by the surface 126 of the cap ring 18 and has a width X. The cavity 148 is preferably of substantially uniform taper from the open end 166 to the closed end 168, however, it will be understood that the thickness of the fins may be varied in a manner that provided areas of nonuniform taper if desired.

With continued reference to FIG. 5, it will be seen that the tip 156 of the fin 102 is spaced a distance Y from closed end 168 to define an annular channel or chamber 170 and the sidewalls 162 and 164 are spaced a distance Z and Z' from the surfaces 158 and 160, respectively, to define annular channels or chambers 172 and 174. The chambers 170, 172 and 174 are interconnected and provide an annular space between the fin 102 and the cavity 148 which is substantially filled with the viscous medium in the assembled coupling 10. The distances Y, Z and Z' may be varied to adjust the size of the chambers to provide desired torque characteristics.

During assembly of the coupling 10, each of the cavities is preferably filled with the viscous medium prior to assembly of the coupling. During assembly, the fins 100–106 are pressed into the cavities 146–152, respectively, to form silicone rubber filled chambers 170, 172 and 174 relative to the fin 102 and cavity 148 and similar silicone rubber filled chambers with respect to the remaining fins and cavities, it being understood that the interleaved relationship could likewise be explained in terms of insertion of the fins 136–144 into cavities 108–114.

Figure 5A:
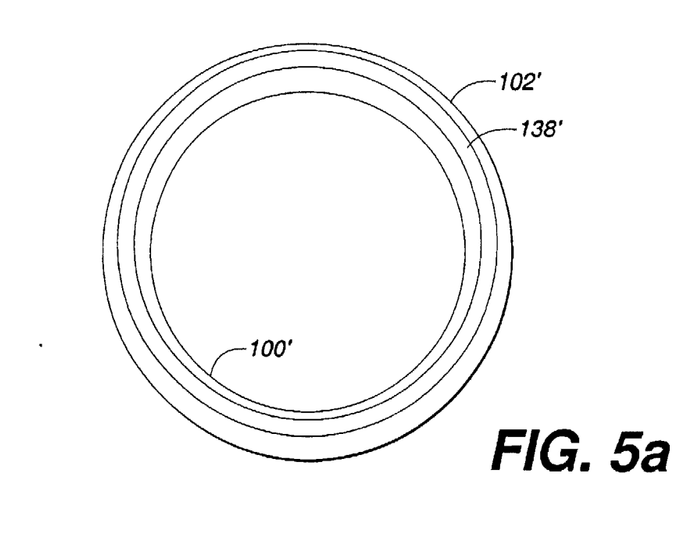
FIG. 5a is an exaggerated cross-sectional view showing a center ring having circular fins and a body ring having circular fins, the fins of the body ring being positioned off-center to the fins of the center ring.

FIG. 5a shows another configuration wherein the center ring 16 has substantially concentric, substantially circular fins, as represented by fins 100' and 102' interleaved with substantially concentric, substantially circular fins of body ring 18, as represented by fin 138'. As can be seen, fins 100' and 102' are offset relative to fin 138' such that they are nonconcentric.

In the preferred mode of operation, the coupling 10 transfers rotational forces from the input shaft 42 to the output shaft 48 so that the drive shaft and the driven shaft rotate at substantially the same rotation rate, it being understood that the output shaft may be connected to a transmission or like device if it is desired to thereafter change the rotational speed which is to be delivered to the equipment receiving a driving force from the output shaft.

As mentioned previously, the shaft 12 may be directly connected to drive shaft 42 of a motor (not shown) so that rotation of the drive shaft 42 results in rotation of the shaft 12 and center ring 16. Likewise, the cap ring 18 may be directly connected to a drive or output shaft for powering a saw or other shaft-driven equipment (not shown). In this regard, it is noted that rotation of the shaft 12 directly rotates the center ring 16. For example, the teeth 98 on the inner periphery of the extension 94 of the center ring 16 engage the splines 74 of the shaft 12 so that the center ring 16 is directly linked to the shaft 12. Rotation of the center ring 16 is then coupled to the cap ring 18 by the silicone fluid within the chambers 170, 172 and 174 to cause rotation of the cap ring 18 in response to rotation of the center ring 16.

Under normal torque conditions, that is under torque conditions which do not exceed a predetermined torque (i.e. for example up to about 225 ft-lbs for heavy equipment powered by a 300 horsepower gasoline motor and up to about 60 ft-lbs for equipment powered by a 20 horsepower electric motor), the silicone medium within the chambers 170, 172 and 174 has sufficient viscosity such that the cap ring 18 rotates in unison with the center ring 16. Therefore, under normal torque conditions, it will be appreciated that the center ring 16 and cap ring 18 have substantially the same, preferably identical, rotational rates and there is no slippage or relative movement between the center ring 16 and the cap ring 18.

Under conditions in which the resistance to rotation of the cap ring 18 becomes excessive, such as when the saw blade is dull, the operator is feeding the saw faster than desired, an object such as a nail is encountered, the increased torque demand to turn the saw blade may cause the rotational rate of the cap ring 18 to decrease. Under these conditions, the center ring 16 continues to rotate at the rate of the shaft 12, but the cap ring 18 rotates at a slower rate due to the increased resistance on the saw blade such that the cap ring 18 and center ring 16 move relative to one another. The relative movement of the center ring 16 and the cap ring 18 may be detected and the operator alerted to this or the motor may be turned off.

To this end, as shown in FIG. 2, the coupling 10 further includes a rotation detection assembly 176 for sensing the rotational rate of the shaft 12 (and hence the center ring 16) and a rotation detection assembly 178 for sensing the rotational rate of the cap ring 18. The assembly 176 includes a plurality of sensed points 180, such as magnets, equally spaced around the periphery of the shaft 12 and a sensor 182 positioned adjacent to the shaft for sensing the sensed points 180 as they pass beneath the sensor 182 during rotation of the shaft 12. Likewise, the assembly 178 includes a plurality of sensed points 184, such as magnets, preferably equally spaced around the periphery of the cap ring 18 and a sensor 186 positioned adjacent to the cap ring 18 for sensing the sensed points 184 as they pass beneath the sensor 182 during rotation of the cap ring 18. While the example of magnets and magnetic sensors are used to illustrate the invention, it is understood that any appropriate rotation sensors, such as optical tachometers, and appropriate sensed points, such as reflective striped tape, may be used as sensed points.

The sensors 182 and 186 sense passage of the sensed points 180 and 184, respectively, and generate an output, such as an electrical signal, which is representative of the rate of rotation of the center ring 16 and the cap ring 18. Suitable sensors include automotive type magnetic sensors. The sensors 180 and 184 are part of an electrical circuit 188 (FIG. 6) for monitoring rotation of the center ring 16 and the cap ring 18.

Figure 6:
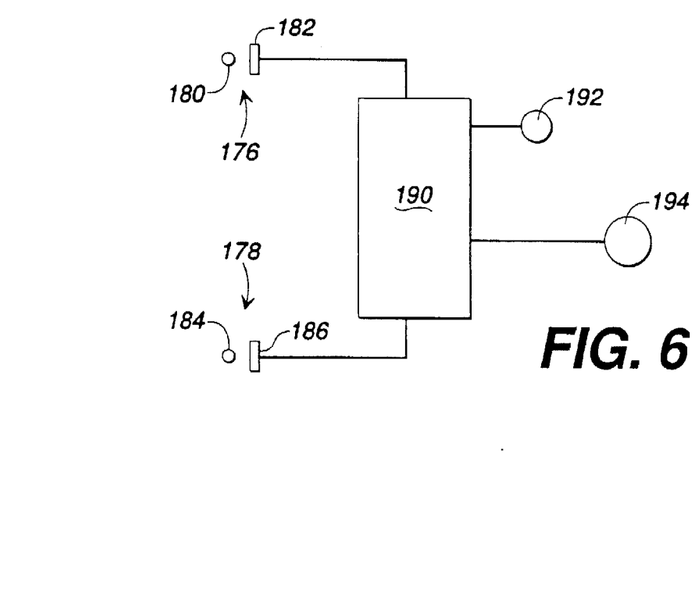
FIG. 6 a schematic diagram of an electrical circuit for monitoring rotation of components of the slip coupling.

With reference now to FIG. 6, the circuit 188 also includes a comparator 190 electrically linked to receive the output from the sensors 180 and 184 for comparing the rotational rate of the center ring 16 to the rotational rate of the cap ring 18, and an indicator, such as alarm 192, for indicating difference between the rotational rate of the center ring 16 as compared to the rotational rate of the cap ring 18. Alternatively, a kill switch 194 may be provided and electrically linked to the motor driving the shaft 42 and activated to shut down power to the motor driving the shaft 42 when the measured difference between the rotational rates of the rings 16 and 18 exceeds a predetermined value. The comparator 190 is preferably a microprocessor based controller system, such as a programmable computer, that is also controlling the operation of the drive system attached to the drive shaft 42. For example, the comparator 190 may be a controller operating an electric motor that also receives signals from sensors 182 and 186 from which the controller calculates a number representing a difference in the speeds indicated by the two sensors. When the difference number exceeds a preset threshold, the controller is programmed, for example, to stop the electric motor. Of course the controller may also be programmed to calculate the actual speed of each of the shafts 42 and 47 based on the signals from sensors 182 and 186 and the actual speed is used to vary the control decisions of comparator 190.

Figure 7:
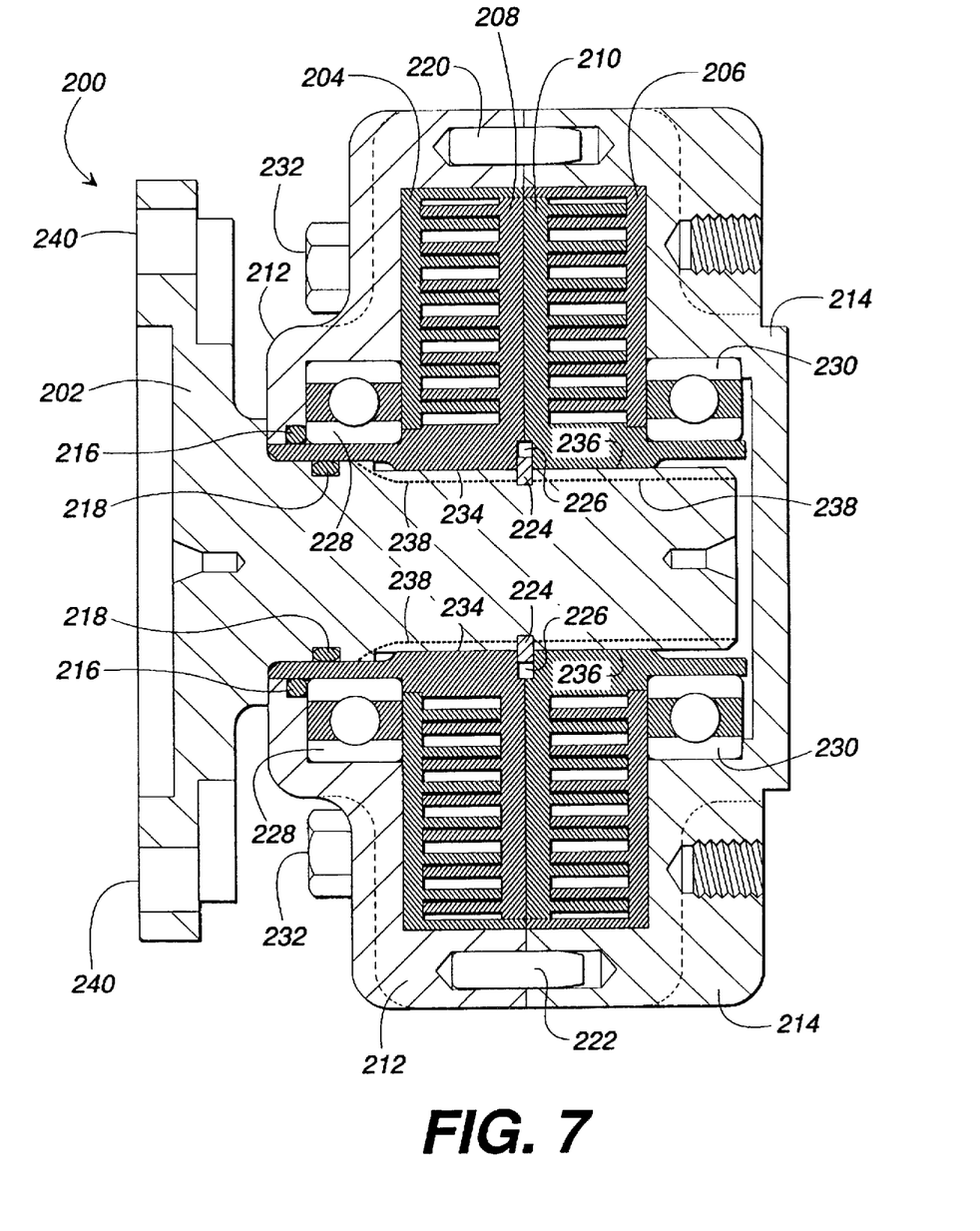
FIG. 7 is a cross-sectional view of another embodiment of a slip coupling having two outer rings and two center rings.

With reference now to FIG. 7 there is shown a cross-sectional view of another embodiment of a slip coupling 200 having a shaft 202, a pair of outer rings 204, 206, a long inner ring 208, a short inner ring 210, a body 212, and a cap 214 having a plurality of threaded openings 215 provided thereon for connecting the cap 214 to a shaft, such as shaft 48. In addition, the coupling 200 includes a pair of O-rings 216, 218, a pair of dowel pins 220, 222, a retaining ring 224, a lock ring 226, a pair of ball bearings 228, 230, and a plurality of bolts 232.

A plurality of teeth 234, 236 are preferably provided on the inner peripheries of the inner rings 208 and 210, respectively, for engaging splines 238 on the shaft 202 so that rotation of the shaft 202 directly drives the inner rings 208 and 210. The shaft 202 may be directly connected to an input or drive shaft (such as shaft 42) of a motor (not shown), as by bolts extending through openings 240 of the shaft 202, and the cap 214 may be connected to a driven shaft, as by bolts received by threaded openings 242.

Each of the rings 204–210 preferably include a plurality of annular, concentric fins positioned so that the rings 204–210 may be positioned in an interleaved configuration similar to that previously described for the cap 18 and center ring 16 of the coupling 10. For example, outer ring 204 includes a plurality of fins 244, outer ring 206 includes a plurality of fins 246, long inner ring 208 includes a plurality of fins 248, and short inner ring 210 includes a plurality of fins 250. In the assembled coupling, the fins 244 are interleaved with the fins 248 to provide a plurality of chambers 252 and the fins 246 are interleaved with the fins 250 to provide a plurality of chambers 254, which are preferably filled with silicone rubber.

Under normal torque conditions, the silicone rubber within the chambers 252 and 254 has sufficient viscosity such that the inner rings 208, 210 rotate in unison with the outer rings 204, 206. Under conditions in which the resistance to rotation of the outer rings becomes excessive, the outer rings continue to rotate at the rate of the shaft 202, but the outer rings rotate at a slower rate. The relative movement of the inner and outer rings may be detected by rotation detection assemblies, such as the assemblies 176 and 178 described previously, and the operator alerted to this or the motor may be turned off.

with reference now to FIGS. 8–12 there is shown a still further embodiment a slip coupling 270 having a plurality of drive disk members 272 spaced apart from one another and in direct drive engagement with splines on a shaft 273, and a plurality of driven disk members 274 between adjacent ones of the disks 272. The spaces between adjacent ones of the disk members 272 and 274 are preferably substantially filled with silicone rubber, such as silicone rubber compound C-162. The shaft 273 is preferably substantially identical in configuration to the shaft 12, except the shaft 273 preferably includes an o-ring 276 located within a groove 277 instead of the seal 24. The coupling 270 also preferably includes a housing 280, a pair of roller bearings 281 and 282 and an o-ring 284.

Figure 9:
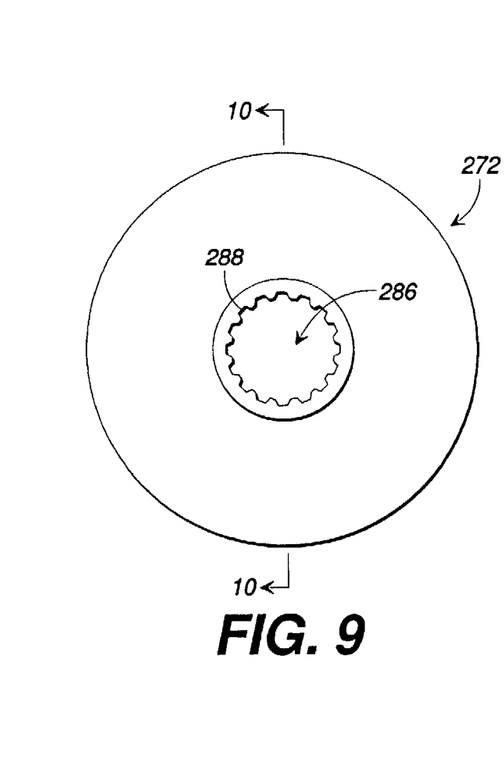
FIG. 9 is a front view of a drive disk used in the coupling of FIG. 8 which is driven by a drive shaft.
Figure 10:
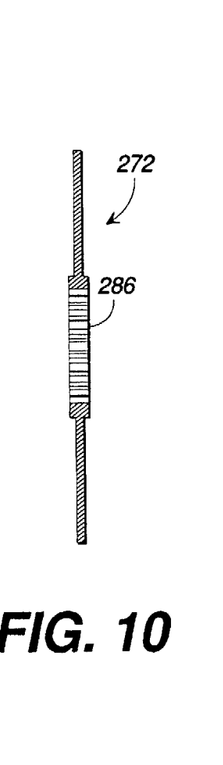

With reference to FIGS. 9 and 10, each of the drive disks 272 preferably includes an opening 286 defined through the center thereof and sized to receive the shaft 273. A plurality of teeth 288 are provided on the inner periphery of the opening and positioned to engage splines of the shaft 73 so that rotation of the shaft 273 will directly drive each disk 272.

Figure 11:
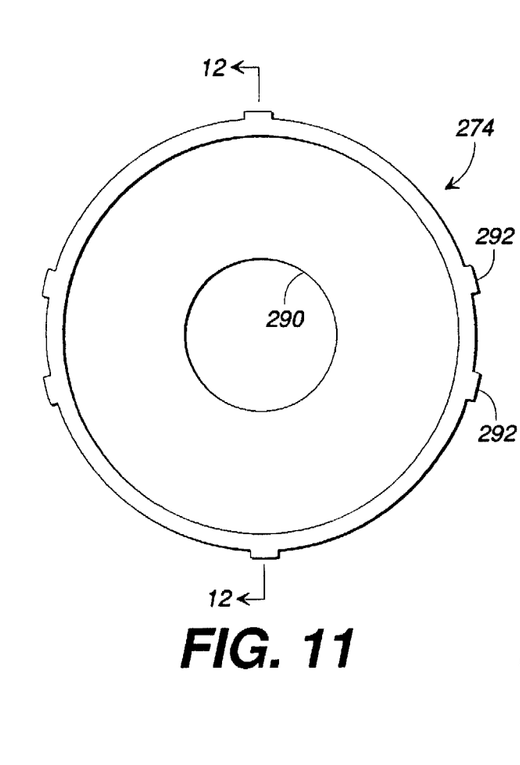
FIG. 11 is a front view of a driven disk used in the coupling of FIG. 8 which is driven by rotation of the drive disk.
Figure 12:
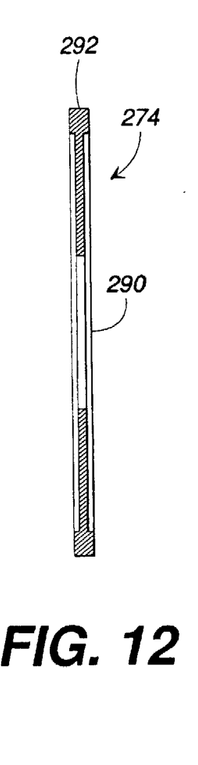
FIG. 12 is a cross-sectional view of the disk of FIG. 11 taken along line 12—12.

With reference to FIGS. 10 and 11, each of the driven disks 274 preferably includes a substantially smooth opening 290 defined through the center thereof for passage of the shaft 273 therethrough. As will be appreciated, the openings 290 are smooth and slightly larger than the openings 286 to provide clearance between the openings 290 and the shaft 273. Each of the disks 274 preferably includes a plurality of notches 292 protruding from the periphery thereof for directly engaging corresponding protrusions on the interior of the housing 280 so that rotation of the driven members 274 will result in rotation of the housing and hence a rotatable member, such as a drive shaft, which may be connected to the housing.

Figure 8:
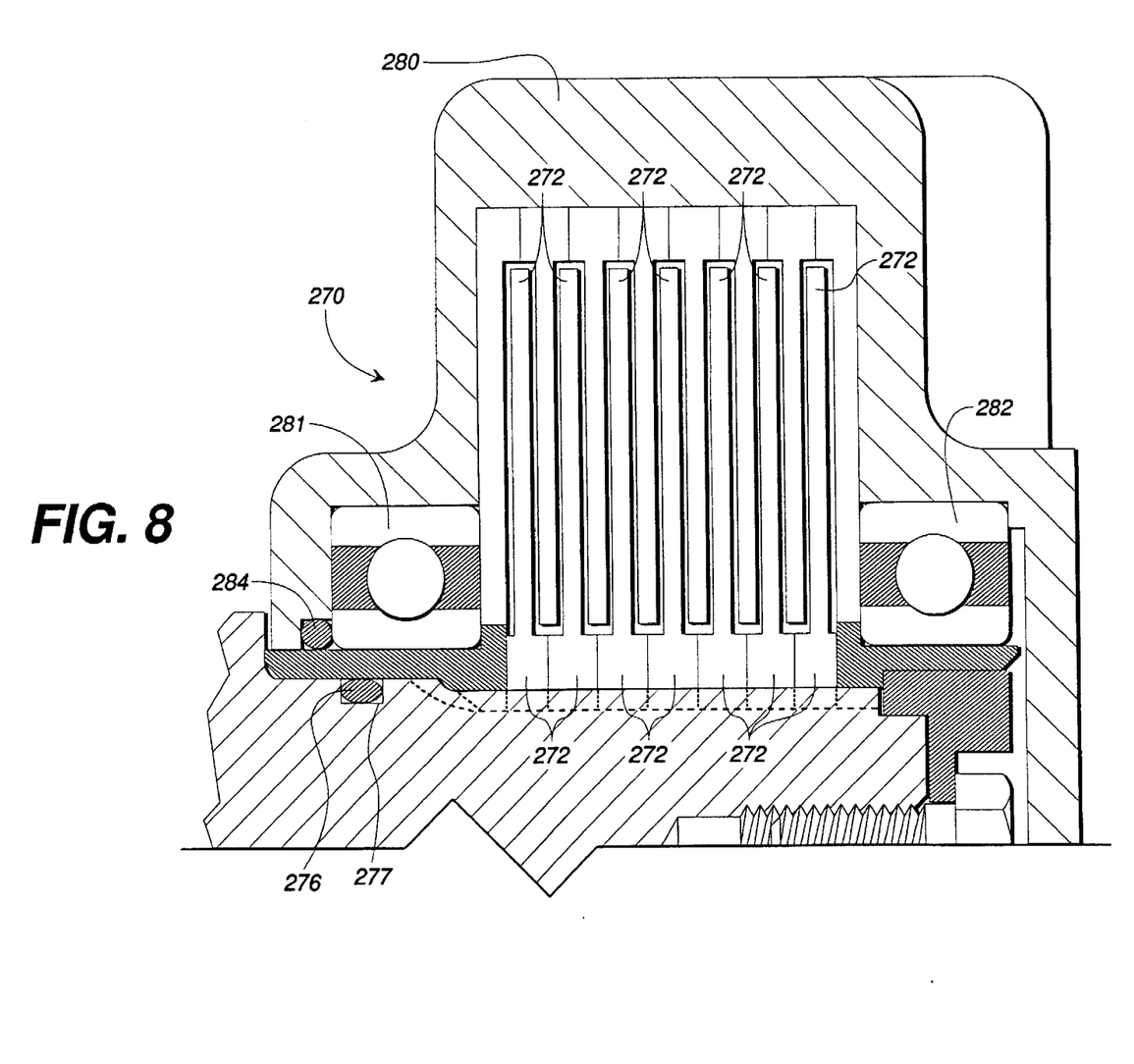
FIG. 8 is a partial cross-sectional view of another embodiment of a slip coupling having a plurality of disk-shaped members.

In operation, the shaft 273 is directly driven, as by a drive shaft, such that rotation of the shaft 273 results in direct drive rotation of the disks 272. Under normal torque conditions, the silicone rubber between the disks 272 and 274 has sufficient viscosity such that the disks 272 and 274 rotate in unison. Under conditions in which the resistance to rotation of the disks 274 becomes excessive, the disks 272 continue to rotate at the rate of the shaft 273, but the disks 274 rotate at a slower rate. The relative movement of the disks 272 and 274 may be detected by rotation detection assemblies, such as those described previously, and the operator alerted to this or the motor driving the shaft 273 turned off.

The foregoing description of preferred embodiments of the present invention are given by way of illustration. In light thereof, those of ordinary skill in the art will appreciate that various modifications may be made without departing from the spirit and scope of the present invention.

I claim:

1. A limited fixed torque slip coupling for transferring torque from a first rotatable member to a second rotatable member to provide rotation of the first and second rotatable members without substantial relative movement of the members when the torque exerted upon the coupling does not exceed a predetermined break-away torque, said coupling comprising:

a first rotatable body for mounting on and rotating with the first rotatable member;

a second rotatable body for mounting on and rotating with the second rotatable member;

a plurality of substantially cylindrical substantially concentric first fins extending outwardly from said first rotatable body in an axial direction and defining a plurality of substantially cylindrical substantially concentric cavities;

a plurality of substantially cylindrical substantially concentric second fins extending outwardly from said second rotatable body in an axial direction, each of said second fins being disposed within one of said cavities;

a viscous medium disposed within said cavities for contacting said first and second fins, said viscous medium comprising a viscous fluid having a viscosity sufficiently great so that the first rotatable member and the second rotatable member rotate substantially in unison when the torque exerted upon the coupling is below the break-away torque;

support means associated with said first and second rotatable bodies for maintaining said second fins within said cavities; and seal means associated with said first and second rotatable bodies and defining a sealed reservoir around said first and second fins for containing said viscous fluid, first sensing means for sensing the rotational rate of the first rotatable body, second sensing means for sensing the rotational rate of the second rotatable body, comparator means for comparing the rotational rate of the first rotatable body sensed by the first sensing means to the rotational rate of the second rotatable body sensed by the second sensing means and for producing a signal corresponding to the difference between the rotational rate of the first rotatable body sensed by the first sensing means as compared to the rotational rate of the second rotatable body sensed by the second sensing means, and indicator means responsive to one or more signals produced by the comparator means for indicating difference between the rotational rate of the first rotatable body sensed by the first sensing means as compared to the rotational rate of the second rotatable body sensed by the second sensing means.

2. The coupling of claim 1, wherein the first sensing means comprises a plurality of sensed points uniformly spaced apart at predetermined locations on said first rotatable body and a sensor positioned adjacent to and spaced apart from said first rotatable body for sensing the presence of said sensed points when they pass by the sensor during rotation of the rotatable body.

3. The coupling of claim 1, said coupling further comprises means for stopping rotation of the first and second rotatable bodies when the indicator means indicates a difference between the rotational rate of the first rotatable body and the second rotatable body.

4. A limited fixed torque slip coupling for use in a device in which a motive force is applied to a first rotatable member and coupled to a second rotatable member to provide rotation of the first and second rotatable members without substantial relative movement of the members during normal operation when the torque in the device not exceed a predetermined break-away torque, said coupling comprising:

a first rotatable body rotatable in response to rotation of said first rotatable member, a second rotatable body, a chamber defined between said first and second rotatable bodies, a viscous medium disposed within said chamber, said medium having a sufficient viscosity to transfer rotation from the first body to the second body substantially without relative rotation between the first and second rotatable bodies during normal operation for torques below the break away torque and for allowing relative rotation between the first and second bodies when the torque in the device exceeds the predetermined break away torque, first sensing means for sensing the rotational rate of the first rotatable body, second sensing means for sensing the rotational rate of the second rotatable body, comparing means for comparing the rotational rate of the first rotatable body sensed by the first sensing means to the rotational rate of the second rotatable body sensed by the second sensing means, indicator means for indicating difference between the rotational rate of the first rotatable body sensed by the first sensing means as compared to the rotational rate of the second rotatable body sensed by the second sensing means.

5. The coupling of claim 4, further comprising a plurality of substantially cylindrical substantially concentric first fins extending outwardly from said first rotatable body in an axial direction, and a plurality of substantially cylindrical substantially concentric second fins extending outwardly from said second rotatable body in an axial direction, said second fins being disposed parallel to and interleaved with said first fins and being offset therefrom so that the first and second fins are not coaxial, wherein said chamber is defined between said first and second fins.

6. The coupling of claim 4, wherein said first and second rotatable members are substantially disk shaped members.

7. A limited fixed torque slip coupling for use in devices in which a motive force is applied to a first rotatable member coupled to a second rotatable member to provide rotation of the first and second rotatable members without substantial relative movement of the members during normal operation when the torque in the device not exceed a predetermined break-away torque, said coupling comprising:

a first rotatable body rotatable in response to rotation of said first rotatable member, a plurality of substantially cylindrical substantially concentric first fins extending outwardly from said first rotatable body in an axial direction, a second rotatable body, a plurality of substantially cylindrical substantially concentric second fins extending outwardly from said second rotatable body in an axial direction, said second fins being disposed parallel to and interleaved with said first fins and being offset therefrom so that the first and second fins are not coaxial, a chamber defined between said first and second fins, a viscous medium disposed within said chamber, the medium having a sufficient viscosity to transfer rotation from the first body to the second body substantially without relative rotation between the first and second rotatable bodies during normal operation for torques in the drive train below the break away torque and for allowing relative rotation between the first and second bodies when the torque in the drive train exceeds the predetermined break away torque, first sensing means for sensing the rotational rate of the first rotatable body, second sensing means for sensing the rotational rate of the second rotatable body, comparing means for comparing the rotational rate of the first rotatable body sensed by the first sensing means to the rotational rate of the second rotatable body sensed by the second sensing means, indicator means for indicating difference between the rotational rate of the first rotatable body sensed by the first sensing means as compared to the rotational rate of the second rotatable body sensed by the second sensing means.

* * * * *

UNITED STATES PATENT AND TRADEMARK OFFICE
CERTIFICATE OF CORRECTION

PATENT NO. : 5,593,012

DATED : January 14, 1997

INVENTOR(S) : Richard E. Aho

It is certified that error appears in the above-identified patent and that said Letters Patent is hereby corrected as shown below:

```
Column 2, line 27, after "3" insert -- is --.
Column 2, line 38, after "6" insert -- is --.
Column 2, line 48, delete "11" and insert -- 10 --.
Column 3, line 23, delete "Body" and insert -- body --
Column 3, line 24, delete "407" and insert -- 40 --.
Column 8, line 63, delete "with" and insert -- With --.
```

Signed and Sealed this

Twenty-second Day of April, 1997

Attest:

BRUCE LEHMAN

*Commissioner of Patents and Trademarks*

*Attesting Officer*